(12) United States Patent
Endo (10) Patent No.: US 10,503,051 B2
(45) Date of Patent: Dec. 10, 2019

(54) OPTICAL DIAPHRAGM DEVICE, LENS BARREL, AND IMAGING DEVICE OR PROJECTION DEVICE

(71) Applicant: Nittoh Inc., Nagano (JP)

(72) Inventor: Junichi Endo, Nagano (JP)

(73) Assignee: NITTOH INC., Nagano (JP)

( * ) Notice: Subject to any disclaimer, the term of this patent is extended or adjusted under 35 U.S.C. 154(b) by 0 days.

(21) Appl. No.: 16/312,288

(22) PCT Filed: May 30, 2017

(86) PCT No.: PCT/JP2017/020162
§ 371 (c)(1),
(2) Date: Dec. 21, 2018

(87) PCT Pub. No.: WO2017/221646
PCT Pub. Date: Dec. 28, 2017

(65) Prior Publication Data
US 2019/0179211 A1    Jun. 13, 2019

(30) Foreign Application Priority Data

Jun. 22, 2016 (JP) ................................ 2016-123161

(51) Int. Cl.
*G03B 9/06* (2006.01)
*G02B 5/00* (2006.01)
*H04N 5/225* (2006.01)

(52) U.S. Cl.
CPC .............. *G03B 9/06* (2013.01); *G02B 5/005* (2013.01); *H04N 5/2254* (2013.01)

(58) Field of Classification Search
CPC .......... G03B 9/06; G03B 5/005; H04N 5/2254
See application file for complete search history.

(56) References Cited

U.S. PATENT DOCUMENTS 6,102,554 A * 8/2000 Wynne Willson ...... F21S 10/02
362/281

FOREIGN PATENT DOCUMENTS

| JP | H5-113591 A | 5/1993 |
| JP | 2011-215319 A | 10/2011 |

OTHER PUBLICATIONS

International Search Report in PCT/JP2017/020162, dated Aug. 15, 2017, 2pp.

* cited by examiner

*Primary Examiner* — Noam Reisner
(74) *Attorney, Agent, or Firm* — Hauptman Ham, LLP (57) ABSTRACT

An optical diaphragm device includes: diaphragm blades each having a first fixing boss protruding from one surface of a first planar plate toward a side in a first direction and a moving boss protruding from the other surface of the first planar plate toward a side in a second direction; light leakage prevention blades each having a second fixing boss protruding from one surface of a second planar plate toward the side in the first direction and forming a pair with the diaphragm blade; a drive ring with cam grooves; and a housing body accommodating the diaphragm blades, light leakage prevention blades and drive ring. A second cam groove is formed on the light leakage prevention blade. The moving boss of the diaphragm blade is inserted into the second cam groove of the light leakage prevention blade, and is inserted into the first cam groove of the drive ring.

8 Claims, 8 Drawing Sheets

OPTICAL DIAPHRAGM DEVICE, LENS BARREL, AND IMAGING DEVICE OR PROJECTION DEVICE

RELATED APPLICATIONS

The present application is a National Phase of International Application Number PCT/JP2017/020162, filed May 30, 2017, which claims priority to Japanese Application Number 2016-123161, filed Jun. 22, 2016.

TECHNICAL FIELD

The present invention relates to an optical diaphragm device, a lens barrel and an imaging device or a projection device.

BACKGROUND ART

In an imaging device such as a camera, an optical diaphragm device is used for adjusting an amount of light from an imaging object which is incident on an imaging plane. The optical diaphragm device includes a circular ring-like housing body. When an aperture diameter of a diaphragm aperture becomes maximum (fully open), a diaphragm blade is retracted within a width of the housing body. Accordingly, with respect to a width of the housing body, it is necessary to ensure at least a width equal to or more than a width of the diaphragm blade as a retraction space for the diaphragm blade.

To narrow such a retraction space for the diaphragm blade for realizing downsizing of the optical diaphragm device, there has been conventionally made an attempt to narrow a width per se of the diaphragm blade (narrowing of a width of the diaphragm blade).

However, it is also known that when narrowing of the width of the diaphragm blade progresses, there arises a drawback that light easily leaks at a portion other than the diaphragm aperture.

To overcome such a drawback on leakage of light, there has been conventionally known an optical diaphragm device where a light leakage prevention blade is introduced in addition to a diaphragm blade, and a gap which causes leakage of light is shielded by the light leakage prevention blade (see patent literature 1, for example).

Figure 8A:
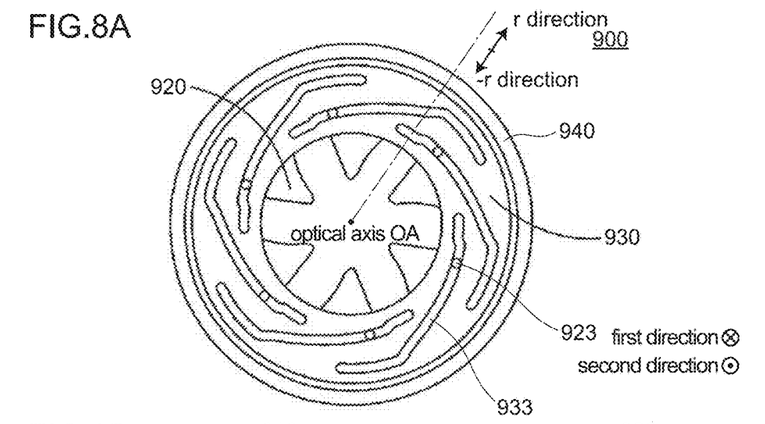
FIG. 8A to FIG. 8D are plan views for describing a conventional optical diaphragm device 900.
Figure 8B:
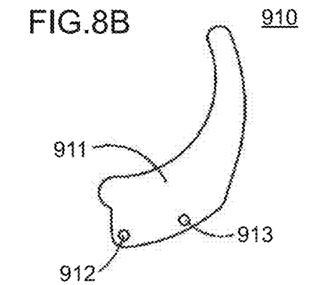
Figure 8C:
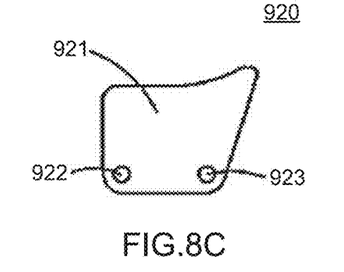
Figure 8D:
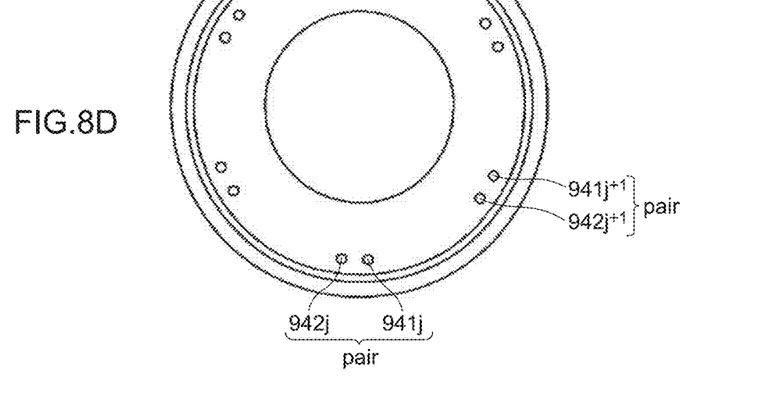

FIG. 8A to FIG. 8D are plan views for describing a conventional optical diaphragm device 900. FIG. 8A is a plan view of the optical diaphragm device 900 as viewed in a plan view along an optical axis OA. In FIG. 8A, only a state where light leakage prevention blades 920 protrude is shown, and the illustration of diaphragm blades 910 is omitted. FIG. 8B is a plan view showing the diaphragm blade 910, and FIG. 8C is a plan view showing the light leakage prevention blade 920, and FIG. 8D is a plan view showing a housing body 940.

As shown in FIG. 8A to FIG. 8D, the conventional optical diaphragm device 900 is an optical diaphragm device 900 for changing an aperture diameter of a diaphragm aperture by advancing or retracting a plurality of blades to and from the optical axis OA. The optical diaphragm device 900 includes: a plurality of diaphragm blades 910 each having a diaphragm blade body 911, a diaphragm blade fixing boss 912 protruding from one surface of the diaphragm blade body 911 toward a side in a first direction along the optical axis OA, and a diaphragm blade moving boss 913 protruding from the other surface of the diaphragm blade body 911 toward a side in a second direction opposite to the first direction; a plurality of light leakage prevention blades 920 each forming a pair with each of the above-mentioned diaphragm blades 910, each light leakage prevention blade 920 having a light leakage prevention blade body 921, a light leakage prevention blade fixing boss 922 protruding from one surface of the light leakage prevention blade body 921 toward the side in the first direction, and a light leakage prevention blade moving boss 923 protruding from the other surface of the light leakage prevention blade body 921 toward the side in the second direction; a drive ring 930 having cam grooves 933 in each of which the moving boss is inserted in a state where a distance between the cam groove 933 and the optical axis OA differs corresponding to a position of the groove, the drive ring 930 being capable of rotating about the optical axis OA so as to move the cam grooves 933 in a circumferential direction about the optical axis OA; and a housing body 940 housing the diaphragm blades 910, the light leakage prevention blades 920, and the drive rig 930. The optical diaphragm device 900 includes a plurality of pairs each consisting of the diaphragm blade 910 and the light leakage prevention blade 920 (six pairs in the conventional optical diaphragm device 900 shown in FIG. 8A to FIG. 8D). The cam grooves 933 are formed in the drive ring 930. The number of cam grooves 930 corresponds to the number of pairs each consisting of the diaphragm blade 910 and the light leakage prevention blade 920. A plurality of pairs each consisting of a first hole 941$j$ and a second hole 942$j$ are formed in the housing body 940 corresponding to the plurality of pairs each consisting of the diaphragm blade 910 and the light leakage prevention blade 920. The diaphragm blade fixing boss 912 and the light leakage prevention blade fixing boss 922 are inserted into the pair of the first hole 941$j$ and the second hole 942$j$ respectively. The number of pairs each consisting of the first hole 941$j$ and the second hole 942$j$ corresponds to the number of pairs each consisting of the diaphragm blade and the light leakage prevention blade. With respect to the diaphragm blade 910 and the light leakage prevention blade 920 which form the stacked pair, the diaphragm blade moving boss 913 and the light leakage prevention blade moving boss 923 are respectively inserted into one cam groove 933 (j: an integer of 1 or more).

According to the conventional optical diaphragm device 900, the light leakage prevention blades 920 can be added while using the existing basic structure for driving the diaphragm blades (the housing body, the drive ring and the like) without modification and hence, leakage of light brought about by narrowing of a width of the diaphragm blade can be prevented.

CITATION LIST

Patent Literature

PTL 1: JP-A-5-113591

SUMMARY OF INVENTION

Technical Problem

However, the conventional optical diaphragm device 900 adopts the structure where the diaphragm blade moving boss 913 and the light leakage prevention blade moving boss 923 are respectively inserted into one cam groove 933. With such a structure, two kinds of blades (the diaphragm blade 910 and the light leakage prevention blade 920) are driven by one cam groove 933. Accordingly, as a length of the cam groove 933, a length for driving the light leakage prevention blade 920 also becomes necessary in addition to a length for driving the diaphragm blade 910.

That is, it is necessary that the cam groove 933 is formed of the groove for driving the diaphragm blade 910 and the groove for driving the light leakage prevention blade 920. Accordingly, the cam groove 933 becomes a long cam groove compared to the configuration where the cam groove 933 is formed of only the groove for driving only either one of the blades.

As described above, in the conventional optical diaphragm device 900, two kinds of blades are driven by one cam groove and hence, the long cam groove becomes necessary. Accordingly, it is difficult to increase the number of cam grooves formed in a limited space of the drive ring 930 and hence, it is difficult to increase the number of diaphragm blades.

It is considered in general that a diaphragm aperture formed by a plurality of diaphragm blades has a shape closer to a circle than an angular shape from a viewpoint of improving quality of imaging, and the shape of the diaphragm aperture can be made as close as possible to a circle by increasing the number of diaphragm blades. Accordingly, it is desirable to increase the number of diaphragm blades from a viewpoint of improving quality of imaging.

The present invention has been made in view of the above-mentioned circumstances, and it is an object of the present invention to provide an optical diaphragm device where the number of diaphragm blades can be easily increased.

Solution to Problem

[1] An optical diaphragm device according to the present invention is an optical diaphragm device capable of changing an aperture diameter of a diaphragm aperture by advancing and retracting a plurality of blades with respect to an optical axis, the optical diaphragm device comprising:

a plurality of diaphragm blades each including: a first blade portion which is formed of a first planar plate and shields light incident on the diaphragm aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;

a plurality of light leakage prevention blades each including: a second blade portion which is formed of a second planar plate and shields light incident on the diaphragm aperture of the optical diaphragm device; and a second fixing boss which protrudes from one surface of the second planar plate toward the side in the first direction, the light leakage prevention blade forming a pair with the diaphragm blade;

a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and a housing body capable of accommodating the diaphragm blades, the light leakage prevention blades, and the drive ring, wherein the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the number of pairs each consisting of the first hole and the second hole being equal to the number of pairs each consisting of the diaphragm blade and the light leakage prevention blade, the first fixing boss and the second fixing boss being inserted into the pair of the first hole and the second hole respectively, a second cam groove is formed in the light leakage prevention blade, and the moving boss of the diaphragm blade is inserted into the second cam groove of the light leakage prevention blade, and is inserted into the first cam groove of the drive ring.

The second cam groove is further formed in the light leakage prevention blade, the moving boss of the diaphragm blade is inserted into the second cam groove of the light leakage prevention blade and the first cam groove of the drive ring. Accordingly, when the drive ring is rotated, a force acts on the moving boss of the diaphragm blade through the first cam groove of the drive ring, and the first blade portion of the diaphragm blade is rotated using the first fixing boss as a fulcrum (rotary shaft). At the same time, along with the movement of the moving boss along the first cam groove, a force acts on the second cam groove of the light leakage prevention blade through the moving boss, and the second blade portion of the light leakage prevention blade is rotated using the second fixing boss as the fulcrum (rotary shaft). In this manner, although the boss which is inserted into the first cam groove of the drive ring is only the moving boss of the diaphragm blade, the light leakage prevention blade can be also driven in an interlocking manner in a step where the diaphragm blade is driven.

According to such an optical diaphragm device, it is unnecessary to form a cam groove pattern for driving the light leakage prevention blade on the first cam groove. Accordingly, a length of the first cam groove can be set shorter than a length of a cam groove in a conventional optical diaphragm device by an amount that the formation of the cam pattern becomes unnecessary. Since the length of the first cam groove can be shortened, the number of first cam grooves formed on the drive ring can be easily increased. In this manner, according to the optical diaphragm device of the present invention, it is possible to provide the optical diaphragm device where the number of diaphragm blades can be increased.

[2] In the optical diaphragm device of the present invention, it is preferable that, with respect to a rotational direction of the drive ring, assuming a direction that the diaphragm blade is moved toward the optical axis by moving the first cam groove due to rotation of the drive ring as a diaphragm rotational direction, the diaphragm blade and the light leakage prevention blade which form a pair be disposed and the positional relationship between the pair consisting of the first hole and the second hole be established such that the second fixing boss of the light leakage prevention blade is positioned in front of the first fixing boss of the diaphragm blade in the diaphragm rotational direction.

By arranging the second fixing boss such that the second fixing boss is positioned in front of the first fixing boss in the diaphragm rotational direction, the distance between the second fixing boss and the second cam groove (the distance between a fulcrum with respect to the rotation of the light leakage prevention blade and a point where a force is applied) L2 can be set longer than the distance between the first fixing boss and the moving boss (a fulcrum with respect to the rotation of the diaphragm blade and a point where a force is applied) L1.

Due to such difference in distance, it is possible to make the angular velocity at which the light leakage prevention blade is rotated slower than angular velocity at which the diaphragm blade is rotated. Accordingly, it is possible to make the light leakage prevention blade protrude with a delay compared with the diaphragm blade.

[3] In the optical diaphragm device of the present invention, it is preferable that, the housing body have a circular cylindrical outer peripheral wall having an inner side on which the diaphragm blade and the light leakage prevention blade are disposed, and a stepped portion having a drive ring placing surface on which the drive ring is placed be disposed on the inner side of the outer peripheral wall, the diaphragm blade have a first protruding portion where the first fixing boss is disposed, the first protruding portion protrude from the first blade portion, the first protruding portion be positioned at a position remoter than an outer peripheral edge of the first blade portion with respect to a distance from the optical axis, and a recessed portion which at least a portion of the first protruding portion enters be formed in the stepped portion of the housing body.

The first protruding portion is positioned at the position remoter than the outer peripheral edge of the first blade portion with respect to a distance from the optical axis, and the recessed portion which at least the portion of the first protruding portion enters is formed in the stepped portion of the housing body. Accordingly, due to the formation of the first protruding portion and the recessed portion, the increase of a diameter of the outer peripheral wall of the housing body can be suppressed compared to the case where neither the first protruding portion nor the recessed portion is formed. As a result, it is possible to realize downsizing of the optical diaphragm device.

[4] In the optical diaphragm device of the present invention, it is preferable that, the housing body have a circular cylindrical outer peripheral wall having an inner side on which the diaphragm blade and the light leakage prevention blade are disposed, and a stepped portion having a drive ring placing surface on which the drive ring is placed be disposed on the inner side of the outer peripheral wall, the light leakage prevention blade have a second protruding portion where the second fixing boss is disposed, the second protruding portion protrudes from the second blade portion, the second protruding portion be positioned at a position remoter than an outer peripheral edge of the second blade portion with respect to a distance from the optical axis, and a recessed portion which at least a portion of the second protruding portion enters be formed in the stepped portion of the housing body.

The second protruding portion is positioned at a position remoter than an outer peripheral edge of the second blade portion with respect to a distance from the optical axis, and the recessed portion which at least the portion of the second protruding portion enters is formed in the stepped portion of the housing body.

Accordingly, due to the formation of the second protruding portion and the recessed portion, the increase of a diameter of the outer peripheral wall of the housing body can be suppressed compared to the case where neither the second protruding portion nor the recessed portion is formed. As a result, it is possible to realize downsizing of the optical diaphragm device.

[5] In the optical diaphragm device of the present invention, it is preferable that, on the outer peripheral edge of at least one of the diaphragm blade and the light leakage prevention blade which form a pair, a recessed portion be formed by cutting away such that when the diaphragm blade and the light leakage prevention blade are moved to a position where the aperture diameter of the diaphragm aperture becomes maximum, the second fixing boss with respect to the diaphragm blade and the light leakage prevention blade which form another pair is disposed inside the recessed portion.

With such an optical diaphragm device, it is possible to avoid the interference between the diaphragm blade 100 and the light leakage prevention blade 200 which form a pair and the second fixing boss 220 with respect to the diaphragm blade 100 and the light leakage prevention blade 200 which form another pair and hence, large-sizing of the optical diaphragm device can be suppressed.

[6] In the optical diaphragm device of the present invention, it is preferable that, with respect to a rotational direction of the drive ring, assuming a direction that the diaphragm blade is moved toward the optical axis by moving the first cam groove due to rotation of the drive ring as a diaphragm rotational direction, the first cam groove be formed at an angle inclined in a direction away from the optical axis as the first cam groove extends in the diaphragm rotational direction with respect to the circumferential direction about the optical axis, and an angle of the second cam groove with respect to the circumferential direction be set small compared to an angle of the first cam groove with respect to the circumferential direction.

With such an optical diaphragm device, compared to the case where the angle of the second cam groove is set larger than the angle of the first cam groove in the circumferential direction, the light leakage prevention blade 200 can be driven more smoothly.

[7] A lens barrel according to the present invention is characterized in that the optical diaphragm device described in any one of the above-mentioned [1] to [6] and a lens are housed in the lens barrel.

[8] An imaging device or a projection device according to the present invention is characterized in that the imaging device or the projection device includes the optical diaphragm device described in any one of the above-mentioned [1] to [6] or the lens barrel described in the above-mentioned [7].

DESCRIPTION OF EMBODIMENTS

Hereinafter, an optical diaphragm device, a lens barrel and an imaging device or a projection device according to the present invention are described in detail based on embodiments shown in drawings.

Embodiment 1

1. Basic Structure of Optical Diaphragm Device 10 According to Embodiment 1

Figure 1A:
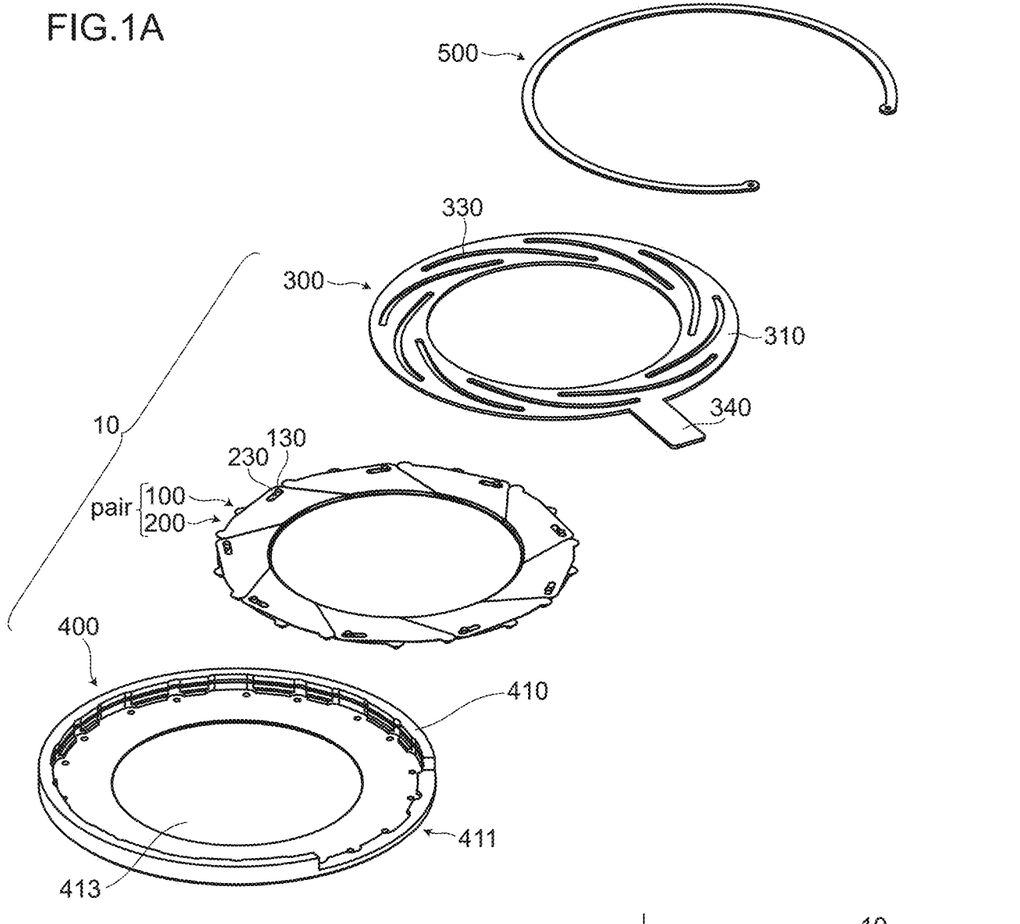
FIG. 1A and FIG. 1B are perspective views for describing an optical diaphragm device 10 according to an embodiment 1.
Figure 1B:
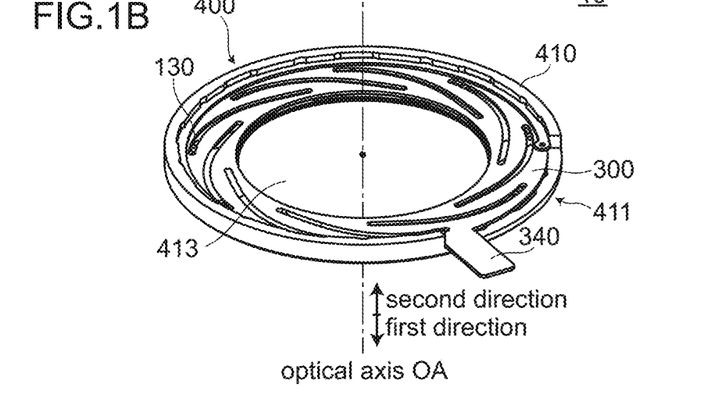
Figure 2A:
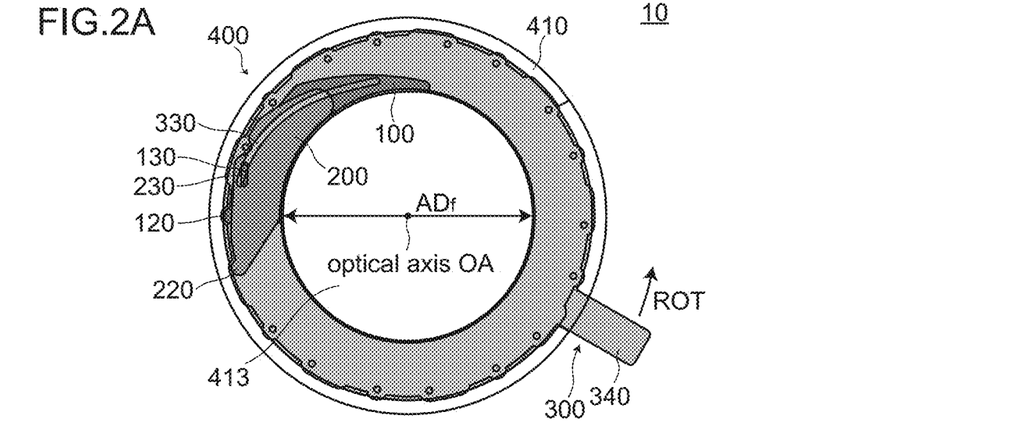
FIG. 2A to FIG. 2C are plan views for describing the optical diaphragm device 10 according to the embodiment 1.
Figure 2B:
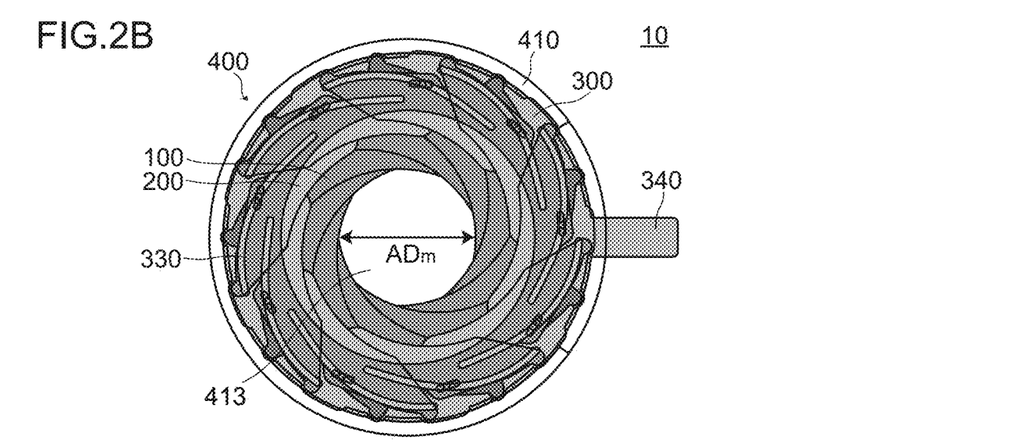
Figure 2C:
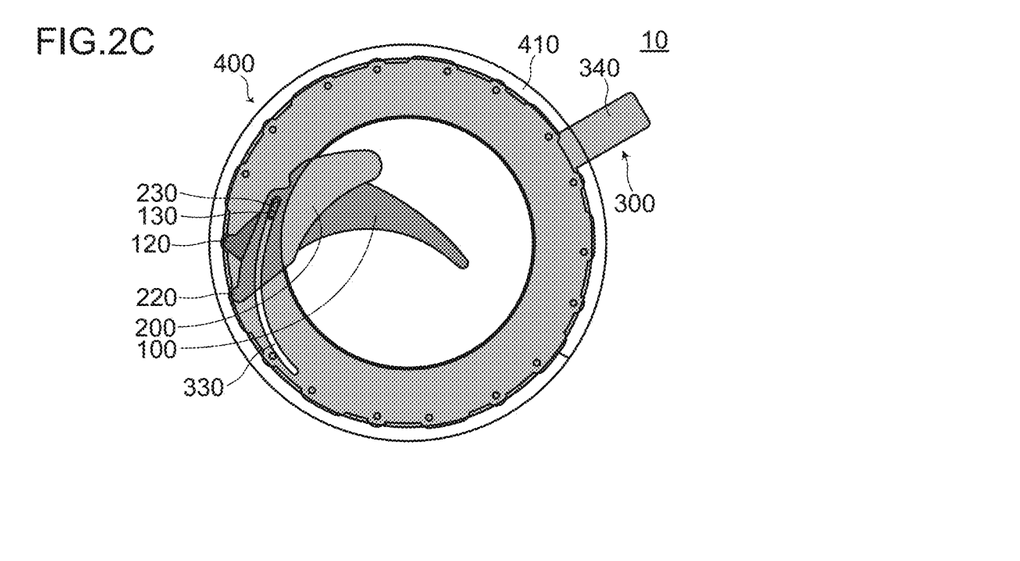

FIG. 1A to FIG. 2C are views for describing an optical diaphragm device 10 according to the embodiment 1. FIG. 1A is a perspective view showing a state where the optical diaphragm device 10 is disassembled. A diaphragm blade 100 and a light leakage prevention blade 200 are illustrated in an overlapping manner with each other. FIG. 1B is a perspective view of the optical diaphragm device 10 in an assembled state. A snap ring 500 is mounted on an inner side of an outer peripheral wall 410 (described later) of a housing body 400 for preventing the removal of a drive ring 300. FIG. 2A to FIG. 2C are plan view of the optical diaphragm device 10 as viewed in a plan view along an optical axis OA. FIG. 2A shows a state where the diaphragm blade 100 and the light leakage prevention blade 200 are retracted within a width (a width in a direction orthogonal to the optical axis OA) of the housing body 400. FIG. 2A shows a state where an aperture diameter of a diaphragm aperture (an aperture formed by the diaphragm blades 100) is set to a maximum value (fully open state). FIG. 2C is a view showing a minimum aperture state where the aperture diameter of the diaphragm aperture is set to a minimum value. FIG. 2B is a view showing an intermediate aperture state where the diaphragm blades 100 and the light leakage prevention blades 200 are moved to a position between the fully open state and the minimum aperture state. In FIG. 2A and FIG. 2C, the diaphragm blade 100 and the light leakage prevention blade 200 which form a pair, and a first cam groove 330 which corresponds to the diaphragm blade 100 and the light leakage prevention blade 200 are illustrated, and other diaphragm blades, light leakage prevention blades, and first cam grooves are omitted from the drawings.

As shown in FIG. 1A to FIG. 2C, the housing body 400 of the optical diaphragm device 10 according to the embodiment 1 has a circular ring shape having an aperture 413 as viewed in a plan view along the optical axis OA. An aperture diameter AD of the diaphragm aperture is changed by protruding a plurality of blades (diaphragm blades 100 in this embodiment) toward the inside of the aperture 413 (toward the optical axis OA). An amount of light which passes through the diaphragm aperture is adjusted by changing the aperture diameter AD of the diaphragm aperture.

The optical diaphragm device 10 includes the diaphragm blades 100, the light leakage prevention blades 200, the drive ring 300, and the housing body 400. Using the housing body 400 as a receiving tray, the plurality of diaphragm blades 100 and the plurality of light leakage prevention blades 200 are stacked on the housing body 400 in an overlapping manner, and the drive ring 300 is placed on the diaphragm blades 100 and the light leakage prevention blades 200. Further, the snap ring 500 is placed on the drive ring 300, and is fitted on an inner wall of the outer peripheral wall 410 of the housing body 400.

As shown in FIG. 2A to FIG. 2C, the aperture diameter AD of the diaphragm is changed in a transcending manner from aperture diameter ADf to an aperture diameter ADm and, then, from the aperture diameter ADm to the aperture diameter in a minimum aperture state corresponding to a protruding amount of the diaphragm blades 100 toward the inside of the aperture 413.

2. Detailed Structure of Optical Diaphragm Device According to Embodiment 1

Figure 3:
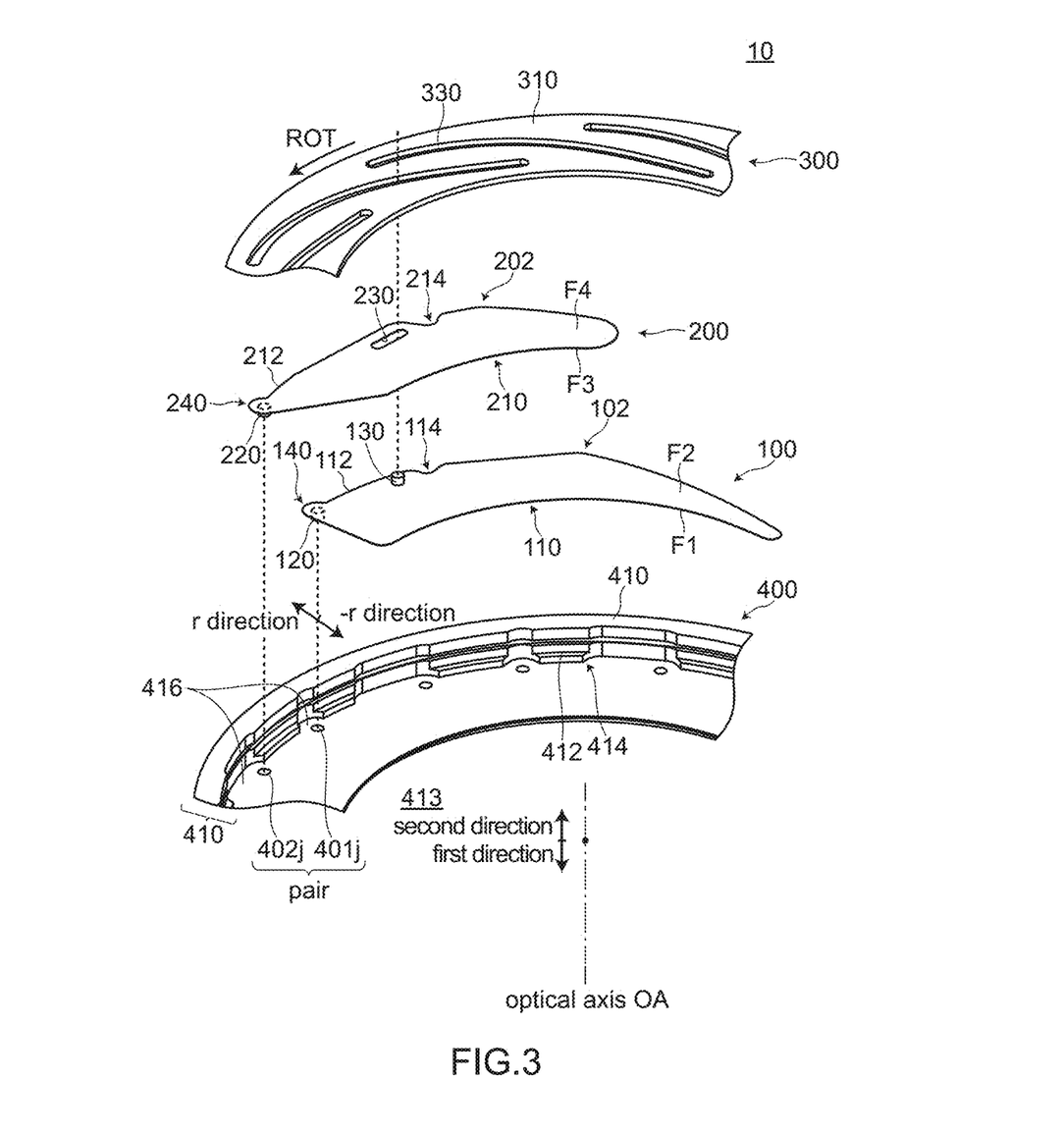
FIG. 3 is a perspective view for describing a main part of the optical diaphragm device 10 according to the embodiment 1.

FIG. 3 is a view for describing a main part of the optical diaphragm device 10 according to the embodiment 1. FIG. 3 is a perspective view of the diaphragm blade 100 and the light leakage prevention blade 200 which form a pair, and portions of the drive ring 300 and the housing body 400 which corresponds to the diaphragm blade 100 and the light leakage prevention blade 200 by spotlighting these constitutional elements. Other constitutional elements are omitted from the drawing.

As shown in FIG. 3, the diaphragm blade 100 has: a first blade portion 110 which is formed of a first planar plate 102, protrudes toward the inside of the aperture 413 thus forming a diaphragm aperture, and shields light incident on the diaphragm aperture of the optical diaphragm device 10; a first fixing boss 120 which protrudes from one surface F1 of the first planar plate 102 toward a side in a first direction along the optical axis OA; and a moving boss 130 which protrudes from the other surface F2 of the first planar plate 102 toward a side in a second direction opposite to the first direction.

The first planar plate 102 has light shielding property, and is made of a material which allows the first planar plate 102 to mate with and to smoothly slide on other constitutional elements (the light leakage prevention blade 200, the housing body 400 and the like). The first fixing boss 120 and the moving boss 130 have a circular cylindrical shape and having a fixed radius respectively. "Fixing" of the first fixing boss 120 means that the position of the boss with respect to the housing body is not moved and is fixed, and the first fixing boss 120 per se is revolvable.

The light leakage prevention blade 200 has: a second blade portion 210 which is formed of a second planar plate 202 and shields light incident on the inside of the optical diaphragm device 10; and a second fixing boss 220 which protrudes from one surface F3 of the second planar plate 202 toward the side in the first direction. Such a light leakage prevention blade 200 forms a pair with the above-mentioned diaphragm blade 100.

In the same manner as the first planar plate 102, the second planar plate 202 is made of a material which allows the second planar plate 202 to mate with and to smoothly slide on other constitutional elements (the diaphragm blade 100, the housing body 400 and the like). The second fixing boss 220 has a circular cylindrical shape having a fixed radius. "fixing" of the second fixing boss 220 means that the position of the boss with respect to the housing body is not moved and is fixed, and the second fixing boss 220 per se is revolvable.

As shown in FIG. 1A to FIG. 3, the drive ring 300 is a ring-like planar plate in which first cam grooves 330 are formed, and has a circular opening on an inner side.

The first cam groove 330 is formed such that the moving boss 130 is inserted into the first cam groove 330, and a distance between the first cam groove 330 and the optical axis OA differs corresponding to a position of the cam groove. However, the first cam groove 330 may partially have a zone where the distance between the first cam groove 330 and the optical axis OA is equal when the cam groove is viewed along a circumferential direction. When such a drive ring 300 is rotated about the optical axis OA, the first cam groove 330 is moved in the circumferential direction about the optical axis OA. In this case, the moving boss 130 inserted into the first cam groove 330 is rotated about the first fixing boss 120. That is, the moving boss 130 is moved in a direction toward the inside of the aperture 413 (hereinafter referred to as −r direction) and in a direction toward the outside of the aperture 413 (hereinafter referred to as r direction) using the first fixing boss 120 as the center of rotation.

Although any method is adopted as a method for imparting a rotational force to the drive ring 300, in the embodiment 1, a rotary lever 340 which integrally rotates with the drive ring body 310 is formed on the drive ring 300, and a force is applied to the rotary lever 340 by a rotational force applying unit not shown in the drawing.

As shown in FIG. 1A to FIG. 3, the housing body 400 has a circular ring like shape as an overall shape, and has the aperture 413 in the inside thereof. As described previously, the housing body 400 accommodates the diaphragm blades 100, the light leakage prevention blades 200, and the drive ring 300.

n sets each consisting of the first hole 401j and the second hole 402j (n being the number of pairs each consisting of the diaphragm blade 100 and the light leakage prevention blade 200) (n: an integer of 2 or more) are formed in the housing body 400. The first hole 401j and the second hole 402j are formed corresponding to the above-mentioned diaphragm blade 100 and the light leakage prevention blade 200 which form a pair. The first fixing boss 120 and the second fixing boss 220 are inserted into the pair of first hole 401j and the second hole 402j respectively.

Further, as shown in FIG. 1B, the housing body 400 has a notched portion 411. The notched portion 411 is formed by cutting away a portion of the outer peripheral wall 410 so as to allow the rotation of the rotary lever 340 of the drive ring 300.

As a whole, the optical diaphragm device 10 has n sets (a plurality of pairs) each consisting of the diaphragm blade 100 and the light leakage prevention blade 200. n pieces (a plurality of) first cam grooves 330 are formed in the drive ring 300 such that the first cam grooves 330 respectively correspond to the moving bosses 130 formed on the respective diaphragm blades 100.

As shown in FIG. 2A, FIG. 2C, FIG. 3 and the like, the diaphragm blade 100 and the light leakage prevention blade 200 which form a pair are stacked on the housing body 400 toward a second direction in order of the diaphragm blade 100 and the light leakage prevention blade 200.

In addition to the above-mentioned configuration, a second cam groove 230 is formed in the light leakage prevention blade 200. The second cam groove 230 is disposed at the position which corresponds to the moving boss 130.

The moving boss 130 of the diaphragm blade 100 is inserted into the second cam groove 230 of the light leakage prevention blade 200, and is also inserted into the first cam groove 330 of the drive ring 300.

Although the moving boss 130 is "inserted into" the first cam groove 330 and the second cam groove 230, the moving boss 130 may not be inserted into the first cam groove 330 by a full depth (a thickness of the drive ring 300), or may penetrate the first cam groove 330 in addition to the second cam groove 230. In the embodiment 1, the moving boss 130 is in a state where the moving boss 130 substantially penetrates the first cam groove 330.

3. Manner of Operation and Advantageous Effects of Optical Diaphragm Device 10 According to Embodiment 1

As described above, the optical diaphragm device 10 according to the embodiment 1 is an optical diaphragm device which changes an aperture diameter of the diaphragm aperture by advancing or retracting the plurality of blades with respect to the optical axis, and the optical diaphragm device 10 includes: the diaphragm blades 100; the light leakage prevention blades 200 each forms a pair with each corresponding diaphragm blade 100; the drive ring 300; and the housing body 400.

The diaphragm blade 100 has: the first blade portion 110 which is formed of the first planar plate 102 and shields light incident on the diaphragm aperture (aperture formed by the diaphragm blades 100) of the optical diaphragm device 10; the first fixing boss 120 which protrudes from one surface F1 of the first planar plate 102 toward the side in the first direction along the optical axis OA; and the moving boss 130 which protrudes from the other surface F2 of the first planar plate 102 toward the side in the second direction opposite to the first direction.

The light leakage prevention blade 200 has: the second blade portion 210 which is formed of the second planar plate 202 and shields light incident on the diaphragm aperture of the optical diaphragm device 10; and the second fixing boss 220 which protrudes from one surface F3 of the second planar plate 202 toward the side in the first direction.

The drive ring 300 has the first cam grooves 330 into which the moving bosses 130 are inserted. With respect to the first cam groove 330, a distance between the first cam groove 330 and the optical axis OA differs corresponding to the position of the cam groove. The drive ring 300 is rotatable about the optical axis OA. Accordingly, when the drive ring 300 is rotated about the optical axis OA, the first cam grooves 330 are moved in a circumferential direction. Accordingly, the moving bosses 130 inserted into the first cam grooves 330 are moved in an r direction or a −r direction.

The housing body 400 accommodates the diaphragm blades 100, the light leakage prevention blades 200 and the drive ring 300.

The optical diaphragm device 10 includes n sets (a plurality of pairs) each consisting of the diaphragm blade 100 and the light leakage prevention blade 200. n pieces of (a plurality of) first cam grooves 330 are formed in the drive ring 300 respectively corresponding to the moving bosses 130 formed on the respective diaphragm blades 100.

n sets each consisting of the first hole 401j and the second hole 402j (n being the number of pairs each consisting of the diaphragm blade 100 and the light leakage prevention blade 200) are formed in the housing body 400. The first fixing boss 120 and the second fixing boss 220 are respectively inserted into each pair consisting of the first hole 401j and the second hole 402j corresponding to the diaphragm blade 100 and the light leakage prevention blade 200 which form a pair.

The second cam groove 230 is formed in the light leakage prevention blade 200, and the moving boss 130 of the diaphragm blade 100 is inserted into the second cam groove 230 of the light leakage prevention blade 200 and is inserted into the first cam groove 330 of the drive ring 300.

In the optical diaphragm device 10 according to the embodiment 1, as described above, the second cam groove 230 is formed in the light leakage prevention blade 200. Further, the moving boss 130 of the diaphragm blade 100 is inserted into the second cam groove 230 of the light leakage prevention blade 200 and is inserted into the first cam groove 330 of the drive ring 300.

With such a structure, the following operations are performed.

(1) The drive ring 300 is rotated by receiving a rotational force from a rotational force applying unit not shown in the drawing.

(2) When the drive ring 300 is rotated, in the diaphragm blade 100, a force acts on the moving boss 130 from the drive ring 300 by way of the first cam groove 330. That is, the diaphragm blade 100 is rotated using the moving boss 130 using a point where a force is applied and the first fixing boss 120 as a fulcrum (rotary shaft).

(3) Along with the rotation (for example, movement in the −r direction) of the moving boss 130 about the first fixing boss 120, in the light leakage prevention blade 200, force acts on the second cam groove 230 from the moving boss 130. That is, the light leakage prevention blade 200 is rotated using a portion where a force acts on the second cam groove 230 from the moving boss 130 as a point where the force is applied and the second fixing boss 220 as a fulcrum (rotary shaft) (see FIG. 3 and the like).

In this manner, in the optical diaphragm device 10 according to the embodiment 1, although the boss which is inserted into the first cam groove 330 of the drive ring 300 is only the moving boss 130 of the diaphragm blade 100, the light leakage prevention blade 200 can be also driven in an interlocking manner with driving of the diaphragm blade 100.

Accordingly, it is sufficient to set the length of the first cam groove 330 to a length necessary for driving the diaphragm blade 100, and it is unnecessary to form a cam groove for driving the light leakage prevention blade 200. Accordingly, the length of the first cam groove 330 can be shorter than the length of the cam groove in the conventional optical diaphragm device. In this manner, the length of the first cam groove 330 can be shortened and hence, the number of first cam grooves 330 which can be formed in the drive ring 300 can be easily increased. Because of such an advantageous effect, the number of diaphragm blades 100 can be also easily increased. Further, the number of light leakage prevention blades 200 each forms a pair with the corresponding diaphragm blade 100 can be also easily increased.

As described above, according to the optical diaphragm device 10 according to the embodiment 1, it is possible to provide the optical diaphragm device where the number of diaphragm blades can be easily increased.

4. Detailed Structure of Other Parts of Optical Diaphragm Device 10 According to Embodiment 1

Figure 4:
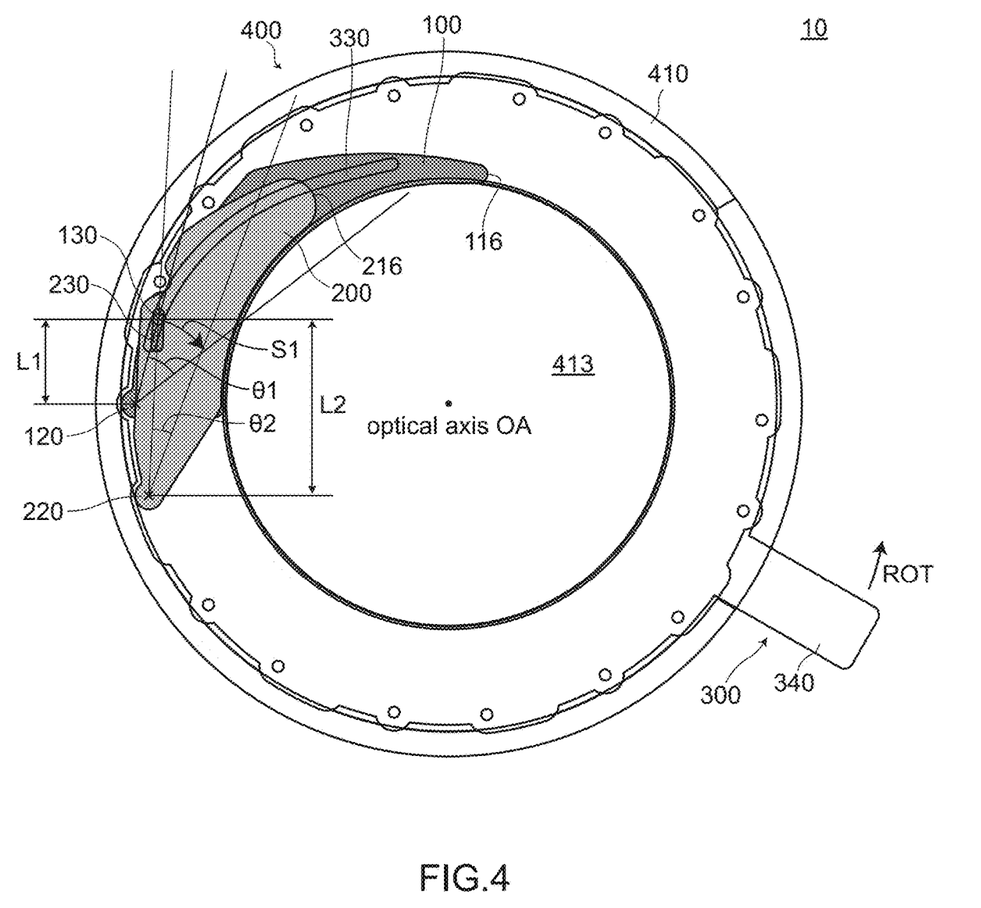
FIG. 4 is a plan view for describing the rotation of a diaphragm blade 100 and a light leakage prevention blade 200 in the optical diaphragm device 10 according to the embodiment 1.

FIG. 4 is a plan view for describing the rotation of the diaphragm blade 100 and the light leakage prevention blade 200 in the embodiment 1. The diaphragm blade 100 and the light leakage prevention blade 200 which form a pair and the first cam groove 330 corresponding to the pair consisting of the diaphragm blade 100 and the light leakage prevention blade 200 are described in the drawing, and other diaphragm blades, other light leakage prevention blades, and other first cam grooves are omitted from the drawing.

Figure 5A:
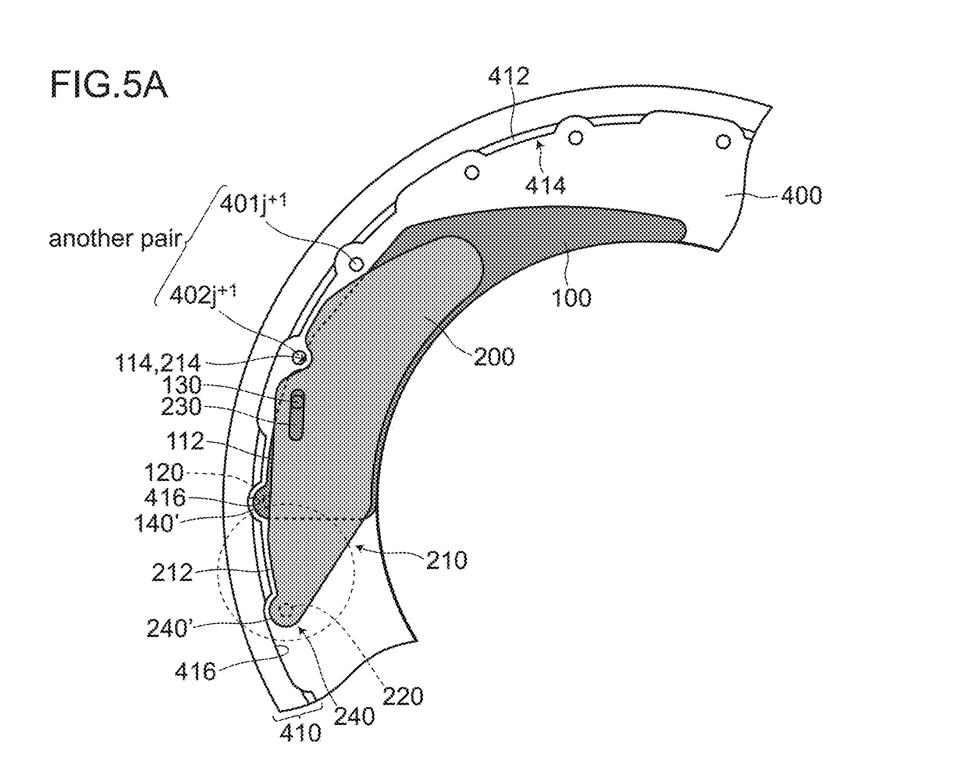
FIG. 5A and FIG. 5B are plan views for describing a main part of the optical diaphragm device 10 according to the embodiment 1.
Figure 5B:
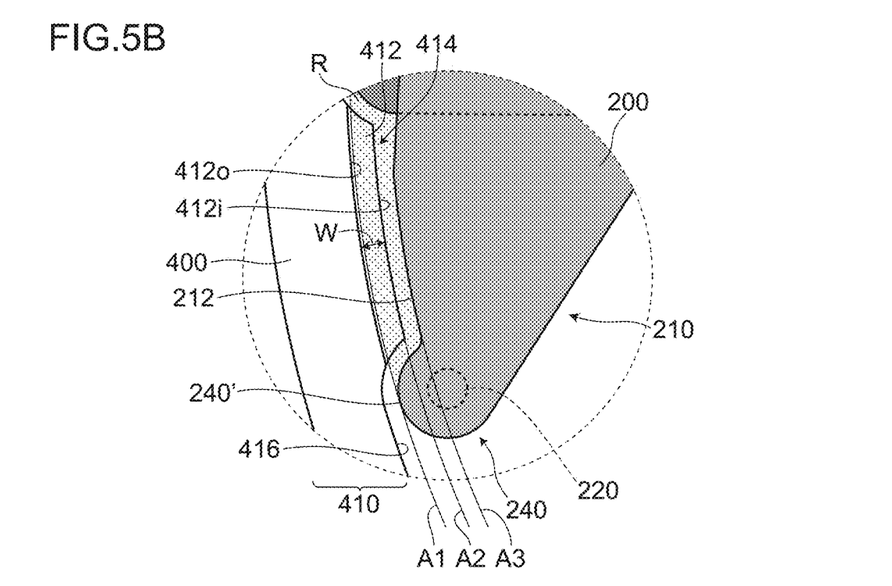

FIG. 5A and FIG. 5B are views for describing a main part of the optical diaphragm device 10 according to the embodiment 1. FIG. 5A is a plan view of the diaphragm blade 100 and the light leakage prevention blade 200 which form a pair, and a portion of the housing body 400 corresponding to the pair consisting of the diaphragm blade 100 and the light leakage prevention blade 200 by spotlighting these constitutional elements, and FIG. 5B is a plan view focused on the second protruding portion 240 and portions in the vicinity of the second protruding portion 240 of the light leakage prevention blade 200 showing these portions in an enlarged manner. Other constitutional elements are omitted from the drawing.

(1) Positional Relationship Between First Fixing Boss 120 and Second Fixing Boss 220

In the optical diaphragm device 10 according to the embodiment 1, the direction which is the rotational direction of the drive ring 300, and the direction along which the diaphragm blade 100 is moved toward the optical axis OA (the direction along which the diaphragm blade 100 is made to protrude toward the inner side of the aperture 413 (−r direction)) by moving the first cam groove 330 due to the rotation of the drive ring 300 is assumed as the diaphragm rotational direction ROT (see FIG. 2A to FIG. 2C, FIG. 3, and FIG. 4).

In this case, the diaphragm blade 100 and the light leakage prevention blade 200 which form a pair are disposed and the positional relationship between the first hole 401j and the second hole 402j which form a pair is established such that the second fixing boss 220 of the light leakage prevention blade 200 is positioned in front of the first fixing boss 120 of the diaphragm blade 100 in the diaphragm rotational direction ROT.

As shown in FIG. 3, FIG. 4 and the like, the moving boss 130 of the diaphragm blade 100 is positioned behind the first fixing boss 120 in the diaphragm rotational direction ROT. The second cam groove 230 of the light leakage prevention blade 200 which receives a force from the moving boss 130 is positioned behind the first fixing boss 120 of the diaphragm blade 100.

In the above-mentioned arrangement, by arranging the second fixing boss 220 so as to be positioned in front of the first fixing boss 120 in the diaphragm rotational direction ROT, as shown in FIG. 4, a distance L2 between the second fixing boss 220 and the second cam groove 230 (or the moving boss 130 inserted into the second cam groove 230) can be set longer than a distance L1 between the first fixing boss 120 and the moving boss 130. That is, the distance L2 between a fulcrum and a point where a force is applied with respect to the rotation of the light leakage prevention blade 200 can be set longer than the distance L1 between a fulcrum and a point where a force is applied with respect to the rotation of the diaphragm blade 100.

When the moving boss 130 is rotated on a trajectory S1 shown in FIG. 4, for example, by rotating the drive ring 300, the second cam groove 230 is rotated about the second fixing boss 220 in an interlocking manner with the rotation of the moving boss 130. Assuming an angle that the diaphragm blade 100 is rotated when the moving boss 130 draws the trajectory S1 due to the rotation of the drive ring 300 as θ1, and an angle that the light leakage prevention blade 200 is rotated when the moving boss 130 draws the trajectory S1 due to the rotation of the drive ring 300 as θ2, the relationship between these angles becomes θ2<θ1 in the optical diaphragm device 10 of the embodiment 1.

That is, angular velocity of the rotation of the light leakage prevention blade 200 is smaller than angular velocity of the rotation of the diaphragm blade 100. Accordingly, it is possible to make a distal end 216 of the second blade portion 210 of the light leakage prevention blade 200 protrude toward the inside of the aperture 413 of the optical diaphragm device 10 with a delay after a distal end 116 of the first blade portion 110 of the diaphragm blade 100 is protruded. Accordingly, it is possible to prevent the occurrence of a case where the light leakage prevention blades 200 protrude to the inside of the aperture 413 prior to protruding of the diaphragm blades 100 and hence, the light leakage prevention blades 200 form the diaphragm aperture.

(2) Recessed Portions 416 Formed on Housing Body 400

(a) Recessed Portion 416 Formed Corresponding to First Protruding Portions 140 of Diaphragm Blade 100

In the optical diaphragm device 10 according to the embodiment 1, the housing body 400 has a circular cylindrical outer peripheral wall 410, and the diaphragm blades 100 and the light leakage prevention blades 200 are disposed on an inner side of the outer peripheral wall 410. On the inner side (optical axis OA side) of the outer peripheral wall 410, a stepped portion 414 having a drive ring placing surface 412 on which the drive ring 300 is placed is disposed. When the housing body 400 is viewed in a plan view along the optical axis OA, on the stepped portion 414 of the housing body 400, the recessed portions 416 in each of which at least a portion of a profile of the first protruding portion 140 enters are formed.

In the optical diaphragm device 10 according to the embodiment 1, the diaphragm blade 100 has a first protruding portion 140 where the first fixing boss 120 is disposed. The first protruding portion 140 protrudes from the first blade portion 110. That is, as shown in FIG. 5A and FIG. 5B (also see FIG. 3), when the optical diaphragm device 10 is viewed in a plan view along the optical axis OA, the first protruding portion 140 is formed on the diaphragm blade 100 such that the first protruding portion 140 protrudes from the first blade portion 110 in a direction away from the optical axis OA. In other words, the diaphragm blade 100 is formed such that a portion of the diaphragm blade 100 which forms the first blade portion 110 has a narrow blade width, and a portion of the diaphragm blade 100 where the first fixing boss 120 is formed is formed as the first protruding portion 140 having a wider blade width than the first blade portion 110. The first fixing boss 120 is disposed on the first protruding portion 140. With respect to a profile of the first protruding portion 140, a profile 140' which is remotest from the optical axis OA in distance is positioned at the position outside an outer peripheral edge 112 of the first blade portion 110 (direction away from the optical axis OA) in a fully open state.

(b) Recessed Portions 416 Formed Corresponding to Second Protruding Portions 240 of Light Leakage Prevention Blades 200

The housing body 400 has the circular cylindrical outer peripheral wall 410, and the diaphragm blades 100 and the light leakage prevention blades 200 are disposed on the inner side (−r direction side) of the outer peripheral wall 410. On the inner side of the outer peripheral wall 410, the stepped portion 414 having the drive ring placing surface 412 on which the drive ring 300 is placed is disposed. When the housing body 400 is viewed in a plan view along the optical axis OA, on the stepped portion 414, recessed portions 416 in each of which at least a portion of a profile of the second protruding portion 240 enters are formed.

In the optical diaphragm device 10 according to the embodiment 1, the light leakage prevention blade 200 has a second protruding portion 240 where the second fixing boss 220 is disposed. The second protruding portion 240 protrudes from the second blade portion 210. That is, as shown in FIG. 5A and FIG. 5B (also see FIG. 3), when the optical diaphragm device 10 is viewed in a plan view along the optical axis OA, the second protruding portion 240 is formed on the light leakage prevention blade 200 such that the second protruding portion 240 protrudes from the second blade portion 210 in a direction away from the optical axis OA. In other words, the light leakage prevention blade 200 is formed such that a portion of the light leakage prevention blade 200 which forms the second blade portion 210 has a narrow blade width, and a portion of the light leakage prevention blade 200 where the second fixing boss 220 is formed is formed as the second protruding portion 240 having a wider blade width than the second blade portion 210. The second fixing boss 220 is disposed on the second protruding portion 240. With respect to a profile of the second protruding portion 240, a profile 240' which is remotest from the optical axis OA in distance is positioned at the position outside an outer peripheral edge 212 of the second blade portion 210 (direction away from the optical axis OA) in a fully open state.

Hereinafter, the manner of operation and advantageous effects of the optical diaphragm device 10 are successively described by focusing on the second protruding portions 240 of the second protruding portions 240 of the light leakage prevention blade 200 in the above-mentioned (b) and portions in the vicinity of the light leakage prevention blade 200.

As shown in FIG. 5B, in the light leakage prevention blade 200, the second protruding portion 240 is disposed to be positioned at the position (the position of an arc indicated by A1) outside (side remote from the optical axis OA in distance) the outer peripheral edge 212 of the second blade portion 210 (the position of an arc indicated by A3). The recessed portions 416 in each of which at least a portion of the second protruding portion 240 enters are formed on the stepped portion 414 of the housing body 400.

In other words, due to the formation of the second protruding portion 240, a recessed region R (region indicated by a mesh) is formed. The region R is a region between the imaginary line A1 and the outer peripheral edge 212 of the second blade portion 210 (the position of the arc indicated by A3). The imaginary line A1 indicates the position of the outer peripheral edge of the second blade portion 210 in the case where the second protruding portion 240 is not formed (in the case where a blade width of the light leakage prevention blade 200 at the portion of the second blade portion 210 is set equal to the blade width at the portion of the second protruding portion 240). Accordingly, by forming the second protruding portion 240 (by narrowing the blade width of the portion of the second blade portion 210 than the blade width of the portion of the second protruding portion 240), the recessed region R is formed between the imaginary line A1 and the outer peripheral edge 212 of the second blade portion 210 (the position of the arc indicated by A3). In the region R, the portion of the drive ring placing surface 412 is disposed such that the portion bites into the region R.

With such a configuration, with respect to the drive ring placing surface 412 which originally requires a relatively large width W, a portion of the width can be disposed within the above-mentioned region R (the drive ring placing surface 412 can be shifted to the inside) and hence, eventually, the increase of a diameter of the outer peripheral wall 410 of the housing body 400 can be suppressed thus realizing downsizing of the optical diaphragm device 10.

Further, according to the above-mentioned configuration (b), the distance between the second fixing boss 220 and the second cam groove 230 can be increased and hence, the light leakage prevention blade 200 can be driven more smoothly.

Also with respect to the diaphragm blade 100, the first protruding portion 140 is configured to be positioned at the position outside (the side remote from the optical axis OA in distance) the outer peripheral edge 112 of the first blade portion 110. Further, the recessed portions 416 in each of which at least a portion of the first protruding portion 140 enters are formed on the stepped portion 414 of the housing body 400.

Accordingly, due to the formation of the first protruding portions 140, large sizing of a diameter of the outer peripheral wall 410 of the housing body 400 can be suppressed compared to the case where the first protruding portion 140 is not formed thus realizing downsizing of the optical diaphragm device 10.

According to the above-mentioned configuration (a), the distance between the first fixing boss 120 and the moving boss 130 can be increased and hence, the diaphragm blade 100 can be more smoothly driven.

Further, by adopting the above-mentioned configuration (a), the distance from the optical axis OA to the first fixing boss 120 can be increased compared to the case where the first protruding portion 140 does not protrude from the outer peripheral edge of the first blade portion 110 (the case where the first protruding portion 140 is not formed). When the distance from the optical axis OA to the first fixing boss 120 is increased, it is necessary to increase a length of the diaphragm blade 100 correspondingly. The reason is as follows. In the case where the same diaphragm aperture diameter is formed, the longer the distance from the optical axis OA to the first fixing boss 120, the more it is necessary to increase of the length of the diaphragm blade 100. On the other hand, when the length of the diaphragm blade 100 is increased, an area of overlapping portions of the diaphragm blades 100 disposed longitudinally adjacently to each other in the diaphragm rotational direction ROT can be increased and hence, a gap formed between the diaphragm blades 100 disposed adjacently to each other can be decreased. That is, a size of the light leakage prevention blade 200 can be decreased, and a moving amount of the light leakage prevention blade 200 can be decreased.

(3) Recessed Portions 114, 214 Formed by Cutting Away Outer Peripheral Edge of Blade In the optical diaphragm device 10 according to the embodiment 1, as shown in FIG. 3 and FIG. 5A, the recessed portions 114, 214 are respectively formed on the outer peripheral edges of the diaphragm blade 100 and the light leakage prevention blade 200 which form a pair.

When the diaphragm blade 100 and the light leakage prevention blade 200 are moved to the position where the aperture diameter of the diaphragm aperture becomes maximum (fully open position, that is, the position at which the diaphragm blade 100 and the light leakage prevention blade 200 are retracted within the width of the housing body 400), the recessed portions 114, 214 are disposed such that the second fixing boss 220 with respect to the diaphragm blade 100 and the light leakage prevention blade 200 which forms another pair (disposed adjacently behind in the diaphragm rotational direction) (the second fixing boss 220 disposed corresponding to the position indicating the second hole 402$j$+1 in FIG. 5A) is disposed inside the recessed portion 114, 214 (inside a profile of the blade when the outer peripheral edge is not cut away) of the diaphragm blade 100 and the light leakage prevention blade 200.

According to such an optical diaphragm device 10 of the embodiment 1, the diaphragm blade 100 and the light leakage prevention blade 200 which form a pair do not overlap with the second fixing boss 220 with respect to the diaphragm blade 100 and the light leakage prevention blade 200 which form another pair and hence, the interference between them can be avoided. Accordingly, large sizing of a diameter of the optical diaphragm device 10 can be suppressed. When the recessed portions 114, 214 are not formed, it is necessary to arrange the second fixing boss 220 with respect to the diaphragm blade 100 and the light leakage prevention blade 200 which form another pair outside the outer peripheral edge 112 of the first blade portion 110 and the outer peripheral edge 212 of the second blade portion 210 and hence, large sizing of the diameter of the optical diaphragm device 10 is brought about.

In the optical diaphragm device 10 according to the embodiment 1, as shown in FIG. 3 and FIG. 5B, on outer peripheral edges of the diaphragm blade 100 and the light leakage prevention blade 200 which form a pair, recessed portions 114, 214 are formed by cutting away such that the second fixing boss 220 with respect to the diaphragm blade 100 and the light leakage prevention blade 200 which form another pair consisting of the diaphragm blade 100 and the light leakage prevention blade 200 (disposed adjacently behind the pair of diaphragm blade 100 and the light leakage prevention blade 200 in the diaphragm direction) are disposed inside the recessed portions 114, 214 when the diaphragm blade 100 and the light leakage prevention blade 200 are moved to the position where an aperture diameter of the diaphragm aperture becomes maximum (fully open position, that is, the position at which the diaphragm blade 100 and the light leakage prevention blade 200 are retracted within the width of the housing body 400).

In the embodiment 1, the recessed portion 114 and the recessed portion 214 are formed on the diaphragm blade 100 and the light leakage prevention blade 200 respectively. However, the recessed portion may be formed on only either one of the diaphragm blade 100 and the light leakage prevention blade 200. In this case, a blade width of either one of the diaphragm blade 100 and the light leakage prevention blade 200 where the recessed portion is not formed may be set narrow so as to prevent the blade from interfering with the second fixing boss 220 when the diaphragm blade 100 and the light leakage prevention blade 200 are moved to the position where the aperture diameter of the diaphragm aperture becomes maximum. By forming the recessed portion 214 at least on the light leakage prevention blade 200, the degree of freedom in determining the shape (length, arrangement and the like) of the second cam groove 230 can be increased.

In the embodiment 1, with respect to the diaphragm blade 100 and the light leakage prevention blade 200 which form another pair, the recessed portions 114, 214 are formed such that the second fixing boss 220 of the light leakage prevention blade 200 is escaped. However, another recessed portion may be further formed for escaping the first fixing boss 120 of the diaphragm blade 100.

(4) Lengths of First Cam Groove 330 and Second Cam Groove 230

As shown in FIG. 3, in the optical diaphragm device 10 according to the embodiment 1, an extension length of the second cam groove 230 is shorter than an extension length of the first cam groove 330. In other words, by setting the extension length of the first cam groove 330 longer than the extension length of the second cam groove 230, it is possible to make the first cam groove 330 as close as possible to a full width of the drive ring 300 and hence, it is possible to increase an amount (stroke amount) of moving the blade toward the inner direction while effectively as much as possible using the driving ring 300 having the narrow width.

Further, in the above-mentioned optical diaphragm device 10, it is sufficient to form the second cam groove 230 having a required minimum length and hence, the light leakage prevention blade 200 can be also formed in a compact shape. Such structure contributes to downsizing of the optical diaphragm device 10.

(5) Angle Made by First Cam Groove 330 and Second Cam Groove 230

As shown in FIG. 4, in the optical diaphragm device 10 according to the embodiment 1, an angle of the first cam groove 330 with respect to the circumferential direction about the optical axis OA is set to an angle inclined in the direction away from the optical axis OA as the first cam grove 330 extends toward the diaphragm rotational direction ROT. On the other hand, an angle of the second cam groove 230 with respect to the circumferential direction is set small compared to the angle of the first cam groove 330 with respect to the circumferential direction.

In such an optical diaphragm device 10 according to the embodiment 1, the angle of the second cam groove 230 with respect to the circumferential direction about the optical axis OA is set small compared to the angle of the first cam groove 330 with respect to the circumferential direction about the optical axis OA. Accordingly, compared to the case where the angle of the second cam groove 230 is set larger than the angle of the first cam groove 330, the light leakage prevention blade 200 can be driven smoothly. By forming the second cam groove 230 along the circumferential direction about the optical axis OA, light leakage prevention blade 200 can be driven more smoothly.

In a fully open state where the diaphragm blade 100 does not protrude into the aperture 413 of the optical diaphragm device 10, it is preferable that the first cam groove 330 intersect with the second cam groove 230 at a relatively small angle (for example, 30° or less). In view of the relationship that the moving boss 130 is inserted into the first cam groove 330 and the second cam groove 230, by adopting such configuration, particularly in starting the rotation of the drive ring 300, the diaphragm blade 100 and the light leakage prevention blade 200 can be more smoothly driven.

Embodiment 2

Next, an optical diaphragm device 10a according to the embodiment 2 is described with reference to FIG. 6.

Figure 6:
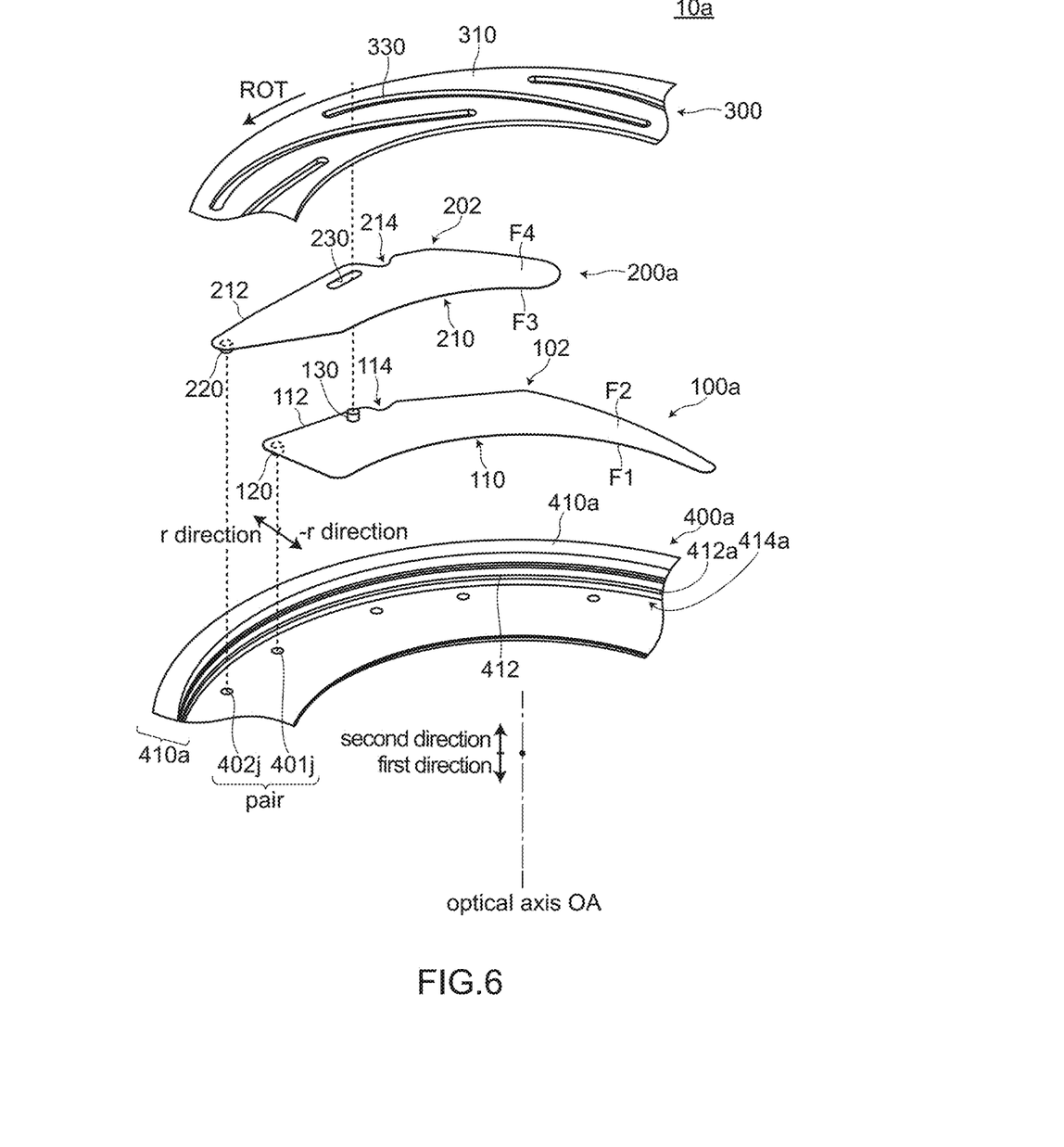
FIG. 6 is a perspective view for describing a main part of an optical diaphragm device 10a according to an embodiment 2.

FIG. 6 is a perspective view for describing a main part of the optical diaphragm device 10a according to the embodiment 2.

The optical diaphragm device 10a according to the embodiment 2 has basically substantially the same configuration as the optical diaphragm device 10 according to the embodiment 1. However, the optical diaphragm device 10a according to the embodiment 2 differs from the optical diaphragm device 10 according to the embodiment 1 with respect to the shape of a diaphragm blade 100a and a shape of a light leakage prevention blade 200a, and the shape of a stepped portion 414a having a drive ring placing surface 412a which is formed on an inner side of an outer peripheral wall 410a of a housing body 400a and on which a drive ring 300 is placed. That is, as shown in FIG. 6, the optical diaphragm device 10a according to the embodiment 2 does not have a portion corresponding to the first protruding portion 140 in the embodiment 1, and the light leakage prevention blade 200a does not have a portion corresponding to the second protruding portion 240. On the stepped portion 414a having the drive ring placing surface 412a formed on the inner side of the outer peripheral wall 410a of the housing body 400a, a portion corresponding to the recessed portion 416 in the embodiment 1 is not formed. An inner wall of the stepped portion 414a is formed in a circular shape about the optical axis OA.

In this manner, the optical diaphragm device 10a according to the embodiment 2 differs from the optical diaphragm device 10 according to the embodiment 1 with respect to the shape of the diaphragm blade 100a, the shape of the light leakage prevention blade 200a, and the shape of the housing body 400a. However, the optical diaphragm device 10a according to the embodiment 2 has the simplified structure compared to the optical diaphragm device 10 according to the embodiment 1 with respect to the diaphragm blade 100a, the light leakage prevention blade 200a, and the housing body 400a. Accordingly, the reduction of man-hours for designing and manufacture can be realized thus further advancing the reduction of cost.

The optical diaphragm device 10a according to the embodiment 2 has substantially the same configuration as the optical diaphragm device 10 according to the embodiment 1 except for the configuration of the diaphragm blade 100a, the light leakage prevention blade 200a, and the housing body 400a. Accordingly, the optical diaphragm device 10a according to the embodiment 2 acquires the corresponding advantageous effects found amongst all advantageous effects which the optical diaphragm device 10 according to the embodiment 1 acquires.

Embodiment 3

Figure 7:
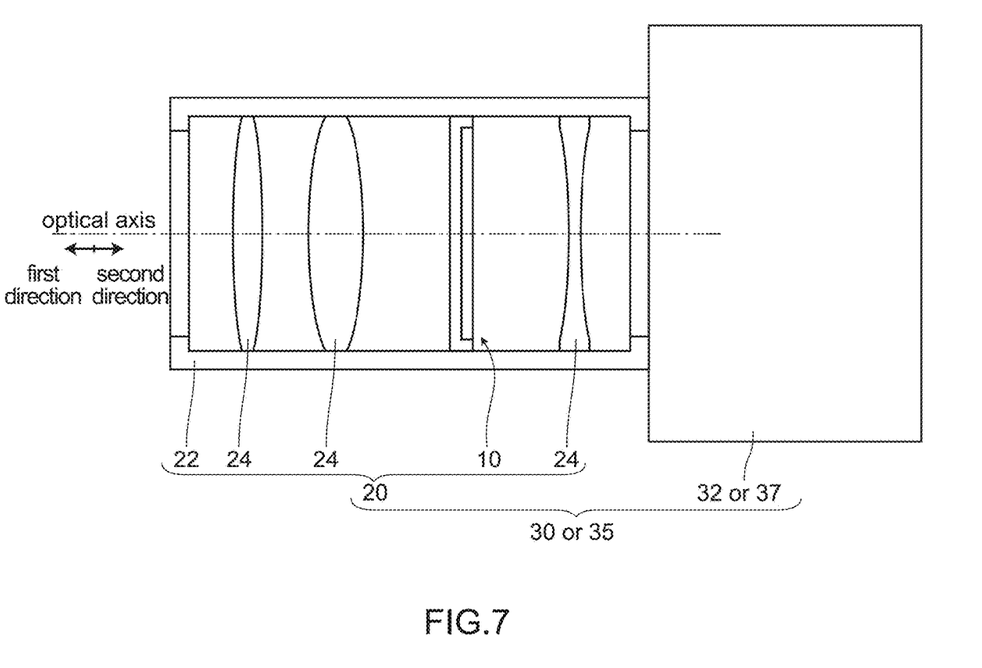
FIG. 7 is a schematic view for describing a lens barrel 20 according to an embodiment 3 and an imaging device 30 or a projection device 35 according to an embodiment 4.

As shown in FIG. 7, in a lens barrel 20 according to the embodiment 3, the optical diaphragm device 10 according to the embodiment 1 and a plurality of lenses 24 are housed in the inside of a lens barrel body 22.

The lens barrel 20 according to the embodiment 3 includes the optical diaphragm device 10 according to the embodiment 1 and hence, it is possible to provide the lens barrel 20 where large-sizing of the lens barrel 20 can be suppressed, and a favorable imaging state can be acquired.

In the embodiment 3, the optical diaphragm device 10a according to the embodiment 2 can be adopted in place of the optical diaphragm device 10 according to the embodiment 1.

Embodiment 4

As shown in FIG. 7, an imaging device 30 according to the embodiment 4 includes: the optical diaphragm device 10 according to the embodiment 1 or the lens barrel 20 according to the embodiment 3, and an imaging device body 32. The imaging device 30 according to the embodiment 4 is applicable to a camera or the like, for example.

As shown in FIG. 7, a projection device 35 according to the embodiment 4 includes the optical diaphragm device 10 according to the embodiment 1 or the lens barrel 20 according to the embodiment 3; and a projection device body 37. The projection device 35 according to the embodiment 4 is applicable to a projector or the like, for example.

The imaging device 30 or the projection device 35 according to the embodiment 4 includes: the optical diaphragm device 10 according to the embodiment 1 or the lens barrel 20 according to the embodiment 3 and hence, it is possible to provide the lens barrel 20 where large-sizing of the lens barrel 20 can be suppressed, and a favorable imaging state can be acquired.

In the embodiment 4, the optical diaphragm device 10a according to the embodiment 2 may be applicable in place of the optical diaphragm device 10 according to the embodiment 1.

Although the present invention has been described based on the above-mentioned embodiments, the present invention is not limited to the above-mentioned embodiments, and the present invention can be carried out without departing from the gist of the present invention, for example, the following modifications are also conceivable.

(1) The numbers, the materials, the shapes, the positions, the sizes and the like of the constitutional elements described in the above-mentioned embodiments are provided only for an exemplifying purpose, and these can be changed within ranges where advantageous effects of the present invention are not impaired.

(2) In the embodiment 1 and the embodiment 2, the case has been exemplified by taking the imaging device such as a camera. However, the present invention is not limited to such an example, and is also applicable to a projection device such as a projector, for example.

(3) In the embodiment 1 and the embodiment 2, "bosses" named as the first fixing boss 120, the second fixing boss 220 and the moving boss 130 are respectively formed of a circular cylindrical body having a fixed radius. However, the bosses are not limited to the configuration where the boss has a fixed diameter. It is sufficient that the first fixing boss 120 and the second fixing boss 220 have the shape which allows them to be formed as a rotary shaft. It is sufficient that the moving boss 130 be inserted through the first cam groove 330 and the second cam groove 230 and be capable of transmitting a force. For example, the moving boss 130 may be formed of a lead line having a radius of approximately 0, a conical shaped member, a mushroom shape member or the like.

The invention claimed is:

1. An optical diaphragm device capable of changing an aperture diameter of a diaphragm aperture by advancing and retracting a plurality of blades with respect to an optical axis, the optical diaphragm device comprising:
   a plurality of diaphragm blades each including: a first blade portion which is formed of a first planar plate and shields light incident on the diaphragm aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;
   a plurality of light leakage prevention blades each including: a second blade portion which is formed of a second planar plate and shields light incident on the diaphragm aperture of the optical diaphragm device; and a second fixing boss which protrudes from one surface of the second planar plate toward the side in the first direction, the light leakage prevention blade forming a pair with the diaphragm blade;
   a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and
   a housing body capable of accommodating the diaphragm blades, the light leakage prevention blades, and the drive ring, wherein
   the optical diaphragm device includes a plurality of pairs each consisting of the diaphragm blade and the light leakage prevention blade, and a plurality of the first cam grooves each of which corresponds to each of the moving bosses are formed in the drive ring,
   a plurality of pairs each consisting of a first hole and a second hole are formed in the housing body corresponding to the plurality of pairs each consisting of the diaphragm blade and the light leakage prevention blade, the number of pairs each consisting of the first hole and the second hole being equal to the number of pairs each consisting of the diaphragm blade and the light leakage prevention blade, the first fixing boss and the second fixing boss being inserted into the pair of the first hole and the second hole respectively,
   a second cam groove is formed in the light leakage prevention blade, and
   the moving boss of the diaphragm blade is inserted into the second cam groove of the light leakage prevention blade, and is inserted into the first cam groove of the drive ring.

2. The optical diaphragm device according to claim 1, wherein with respect to a rotational direction of the drive ring, assuming a direction that the diaphragm blade is moved toward the optical axis by moving the first cam groove due to rotation of the drive ring as a diaphragm rotational direction,
   the diaphragm blade and the light leakage prevention blade which form a pair are disposed and the positional relationship between the pair consisting of the first hole and the second hole is established such that the second fixing boss of the light leakage prevention blade is positioned in front of the first fixing boss of the diaphragm blade in the diaphragm rotational direction.

3. The optical diaphragm device according to claim 1, wherein the housing body has a circular cylindrical outer peripheral wall having an inner side on which the diaphragm blade and the light leakage prevention blade are disposed, and a stepped portion having a drive ring placing surface on which the drive ring is placed is disposed on the inner side of the outer peripheral wall,
   the diaphragm blade has a first protruding portion where the first fixing boss is disposed, the first protruding portion protrudes from the first blade portion,
   the first protruding portion is positioned at a position remoter than an outer peripheral edge of the first blade portion with respect to a distance from the optical axis, and
   a recessed portion which at least a portion of the first protruding portion enters is formed in the stepped portion of the housing body.

4. The optical diaphragm device according to claim 1, wherein the housing body has a circular cylindrical outer peripheral wall having an inner side on which the diaphragm blade and the light leakage prevention blade are disposed, and a stepped portion having a drive ring placing surface on which the drive ring is placed is disposed on the inner side of the outer peripheral wall,
   the light leakage prevention blade has a second protruding portion where the second fixing boss is disposed, the second protruding portion protrudes from the second blade portion,
   the second protruding portion is positioned at a position remoter than an outer peripheral edge of the second blade portion with respect to a distance from the optical axis, and
   a recessed portion which at least a portion of the second protruding portion enters is formed in the stepped portion of the housing body.

5. The optical diaphragm device according to claim 1, wherein on the outer peripheral edge of at least one of the diaphragm blade and the light leakage prevention blade which form a pair, a recessed portion is formed by cutting away such that when the diaphragm blade and the light leakage prevention blade are moved to a position where the aperture diameter of the diaphragm aperture becomes maximum, the second fixing boss with respect to the diaphragm blade and the light leakage prevention blade which form another pair is disposed inside the recessed portion.

6. The optical diaphragm device according to claim 1, wherein with respect to a rotational direction of the drive ring, assuming a direction that the diaphragm blade is moved toward the optical axis by moving the first cam groove due to rotation of the drive ring as a diaphragm rotational direction, the first cam groove is formed at an angle inclined in a direction away from the optical axis as the first cam groove extends in the diaphragm rotational direction with respect to the circumferential direction about the optical axis, and an angle of the second cam groove with respect to the circumferential direction is set small compared to an angle of the first cam groove with respect to the circumferential direction.

7. A lens barrel in which the optical diaphragm device according to claim 1 and a lens are housed.

8. An imaging device or a projection device comprising: the optical diaphragm device according to claim 1.

* * * * *